UNITED STATES PATENT OFFICE.

W. N. ABBOTT, OF BOSTON, MASSACHUSETTS, ASSIGNOR TO HIMSELF, G. W. BOYLE, AND F. N. TERRENT, OF BALTIMORE, MARYLAND.

IMPROVED LUBRICATING-COMPOUND.

Specification forming part of Letters Patent No. 97,335, dated November 30, 1869.

*To all whom it may concern:*

Be it known that I, W. N. ABBOTT, of the city of Boston, in the county of Suffolk and State of Massachusetts, have invented certain Improvements in Composition of Matter for Lubricating Machinery, of which the following is a specification, reference being had to the accompanying drawings.

My invention relates to composition of matter for the purpose of producing a lubricant for machinery; and consists, first, in mixing a certain quantity of soap-stone, magnesia, lime, and water, and then adding about an equal quantity of any animal or vegetable oil or grease, as hereinafter explained.

In making my composition for a lubricant I take five (5) pounds of soap-stone, five (5) pounds of magnesia, and a half-bushel of lime, and dissolve them in about forty (40) gallons of water, and, when completely dissolved or mixed, I add about an equal quantity, by measure, of any animal or vegetable oil, or of any grease or fatty matter reduced to the consistency of oil, and then thoroughly mix the whole in any convenient manner.

A smaller or larger quantity of the mixture may be made by taking any fractional parts of the above proportion of ingredients, or any multiples of the same, and mixing them in a similar manner.

While the proportions above given are found to give the most desirable results, yet the quantity of each ingredient may be somewhat varied, and still a very useful product be obtained.

This mixture I have discovered by long and continued use to be both serviceable and durable. It answers a better purpose than pure oil or grease, and is cheaper and safer. The ingredients are few, cheap, and readily obtained. The great quantity of earthy matter and water in the composition serves to protect it from fire, and thus renders its use safe in the presence of that element.

Having thus described my composition, what I claim is—

A lubricant for machinery composed of the ingredients in the proportions and manner substantially as herein described.

W. N. ABBOTT.

Witnesses:
 H. B. MUNN,
 PHIL. T. DODGE.